United States Patent [19]

Ryder

[11] Patent Number: 4,915,325

[45] Date of Patent: Apr. 10, 1990

[54] FULL BODY RESTRAINT SYSTEM

[75] Inventor: Susan Ryder, Sunnyvale, Calif.

[73] Assignee: United States of America as Represented by the Administrator, National Aeronautics and Space, Washington, D.C.

[21] Appl. No.: 277,829

[22] Filed: Nov. 29, 1988

[51] Int. Cl.$^4$ .............................................. B64D 11/00
[52] U.S. Cl. .................................................. 244/118.5
[58] Field of Search ............... 272/109, 120, 143, 144; 182/3, 4; 128/68, 78, 806; 297/468, 467, 487, 488; 405/186; 244/118.5

[56] References Cited

U.S. PATENT DOCUMENTS 3,754,787  8/1973  Garber .................................. 297/467
4,349,195  9/1982  Johnston ............................. 128/80 G Primary Examiner—Joseph F. Peters, Jr.
Assistant Examiner—Anne Sartelle
Attorney, Agent, or Firm—Darrell G. Brekke; John R. Manning; Charles E. B. Glenn

[57] ABSTRACT

A body restraint system (30) allows the user's body (10) to be in the zero gravity neutral posture. The system (30) includes a waist restraint (32) in the form of a curved, padded unit (34) containing a retractable belt (36) coiled on a spring loaded capstan (38) with a buckle (40) extending from front (42) of the unit (34). A second belt (44) is fastened around the user's waist (16). A clasp (46) is configured to engage the buckle (40). The waist restraint (32) is positioned near foot restraints (52). The foot restraints (52) have foot platforms (59) with pads (60) of a suitable two part attaching material, such as the fasteners available from Minnesota Mining and Manufacturing Company under the trademark Scotchmate Duallock. A mating pad (62) of the material is provided on soles (64) of cotton net shoes (66).

21 Claims, 5 Drawing Sheets

FULL BODY RESTRAINT SYSTEM

ORIGIN OF THE INVENTION

The invention described herein was made by an employee of the United States Government and may be manufactured and used by or for the Government for governmental purposes without the payment of any royalties thereon or therefor.

TECHNICAL FIELD

The present invention relates generally to body restraint systems for use in manned space missions. More particularly, it relates to such a body restraint system for maintaining the user's body in appropriate work space envelope in zero and microgravity environments, such as space stations and space vehicles.

BACKGROUND ART

Numerous body restraint systems have been used in manned space missions. Not all of them are full body restraint systems in that they restrain the user only at one body point. Devices used by NASA on the Skylab missions included foot loops on the floor, a triangle shoe and grid system, a wardroom table thigh restraint, and an ATM chair restraint. The Soviet cosmonauts have used body restraints designed mainly around elastic cords which harness the user.

A variety of restraint systems not intended for zero or microgravity use are also known in the art. For example, U.S. Pat. No. 2,976,914, issued Mar. 28, 1961 to Miller, discloses Velcro fasteners for floor cushions in an aircraft cabin. U.S. Pat. No. 3,165,168, issued Jan. 12, 1965 to Rose, discloses a boatswain's chair waist restraint. U.S. Pat. No. 4,235,182, issued Nov. 25, 1980 to Bürger, discloses a chest, foot and hand restraint system for water skiing and windsurfing. U.S. Pat. No. 4,457,510, issued July 3, 1984 to Pertschuk, discloses the use of Velcro pads to hold the user's feet against a wall while exercising. U.S. Pat. No. 4,591,148, issued May 27, 1986 to Slater, discloses the use of Velcro pads with a clamp to hold the user's feet against a door while exercising. U.S. Pat. NO. 4,637,629, issued Jan. 20, 1987 to Cummings, discloses a flexible torso restraint for aircraft crew members that allows body movement within a localized space.

In general, past approaches for zero gravity body restraints have been ineffective in part or in whole due to (1) the position into which they put the user's body and, as a result, the strain required to use the device and (2) the level of complexity involved in the use of the device. The foot loops used on Skylab required that the user constantly strain his or her toes against the loops in order to be restrained. The triangle shoes and grid arrangement put the user in a flat-footed position, which made the user strain against the dropped foot position assumed in the neutral body position in zero gravity. The system required the user to be precise in foot placement, and it was necessary to unlock oneself from the grid to be released, both of which were difficult to do quickly. Other problems were the massiveness of the cleat and the requirement to bend over to lace the high top shoes used, a difficult task in zero gravity. The thigh restraints produced another body position problem. Since these restraints straightened the user out, in order to use the wardroom table, it was necessary effectively to go into a sit up position and hold it. The chair restraint system proved altogether unacceptable as there is no need to try to sit in zero gravity, and it requires strain by the user to maintain the position the restraint induces.

SUMMARY OF THE INVENTION

Accordingly, it is an object of this invention to provide a body restraint system for a zero or microgravity environment which requires no strain by the user in order to be restrained.

It is another object of the invention to provide a body restrain system which is compatible with the neutral body position in a zero or microgravity environment.

It is a further object of the invention to provide such a body restraint system which will restrain the user's body in an appropriate work space envelope while allowing the user to perform various tasks without having to disconnect from the restraint system.

It is another object of the invention to provide such a body restraint system incorporating three points of body contact, at least one of which can be displaced linearly.

It is still another object of the invention to provide such a body restraint system which incorporates a simple positive locking mechanism and which does not require the user to be precise in foot placement.

It is a still further object of the invention to provide such a body restraint system incorporating three points of body contact in which the user's hands remain free.

The attainment of these and related objects may be achieved through use of the novel body restraint system herein disclosed. A body restraint system for a zero or microgravity environment in accordance with this invention has a waist restraint including means to engage a user's waist. The means to engage the user's waist includes a retractable tether. The system includes a pair of foot restraints positioned with respect to the waist restraint so that the user's body assumes a zero gravity neutral posture when the user's waist engages the waist restraint and the user's feet engage the pair of foot restraints.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIGS. 3 and 4 are perspective views of the body restraint system of FIGS. 1-3 in different positions during use.

DETAILED DESCRIPTION OF THE INVENTION

Figure 1:
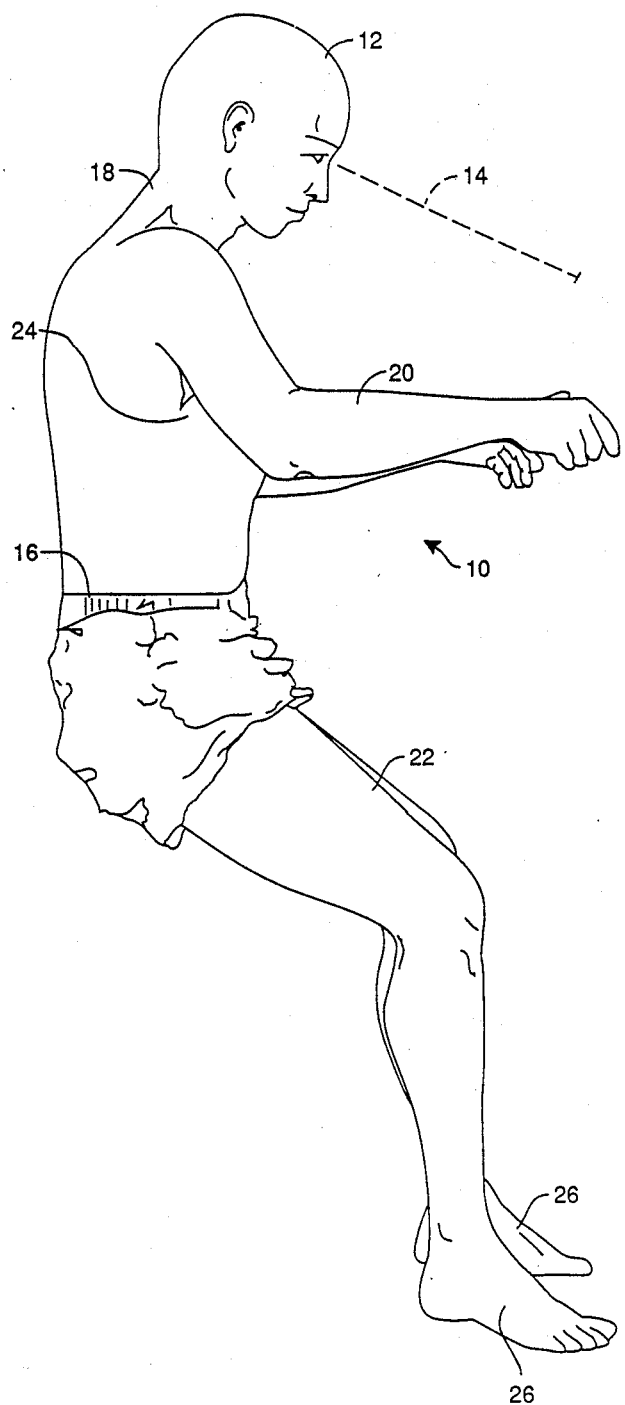
FIG. 1 is a side view of a person in a zero or microgravity environment, useful for an understanding of the present invention.

Turning now to the drawings, more particularly to FIG. 1, there is shown a person 10 in the neutral body position for a zero or microgravity environment. Note that the person's head 12 is thrust forward, with a lowered line of sight 14. Overall, there is an effective height decrease compared with a normal standing position in a gravity environment. However, there is an increase in length between the person's waist 16 and neck 18. The person's arms 20 and legs 22 approach quadruped position. There is a decrease in the girth of waist 16 and chest 24 and a reduction in leg mass due to fluid shift compared with the gravity environment. Feet 26 are flexed.

In the zero or microgravity environment, substantial effort on the part of the person 10 is required to hold the body in a position other than this neutral posture. The closest terrestrial equivalent is the effort required to maintain the body in a different position than the neutral buoyancy body position in water. In a gravity environment, the body will remain in a rest position indefinitely. In a zero or microgravity environment, the body is not as fixed in position and will tend to drift relative to its surroundings as a result of normal body motion. Some form of body restraint is therefore necessary to avoid constant effort to maintain a particular position and orientation with respect to surroundings. Any body restraint that requires the body to be in other than the zero gravity neutral posture of FIG. 1 represents a less than optimum solution for a zero or microgravity environment, because the user will still have to exert a constant effort to maintain the required different position.

FIGS. 2-6 show a body restraint system 30 which allows the user's body 10 to be in the zero gravity neutral posture. The system 30 includes a waist restraint 32 in the form of a curved, padded unit 34 containing a belt 36 (see especially FIG. 3) coiled on a capstan 38 with a buckle 40 extending from padded front 42 of the unit 34. A second belt 44 is fastened around the user's waist 16. A clasp 46 on an extension 48 of the belt 44 is configured to engage the buckle 40.

Figure 5:
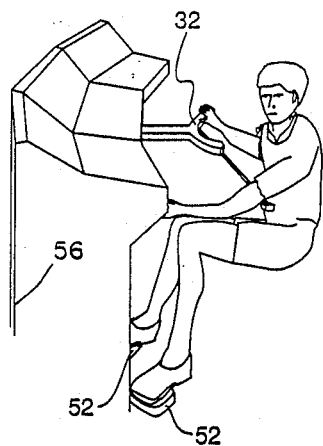
Figure 4:
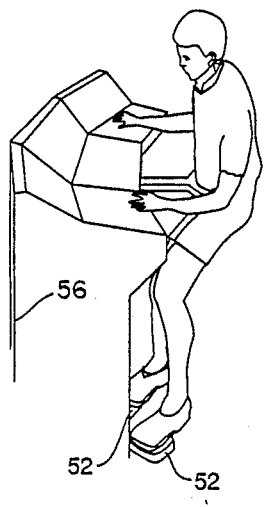
Figure 2:
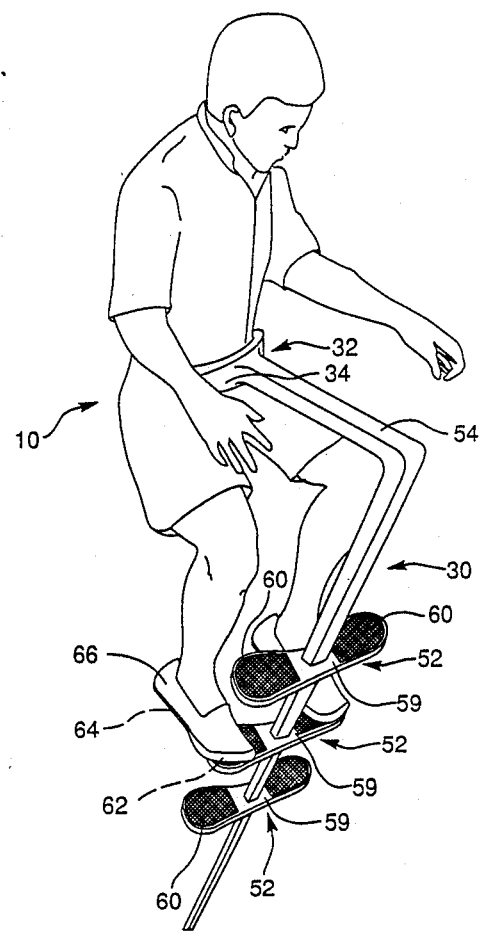
FIG. 2 is a perspective view of body restraint system in accordance with the invention in use.
Figure 3:
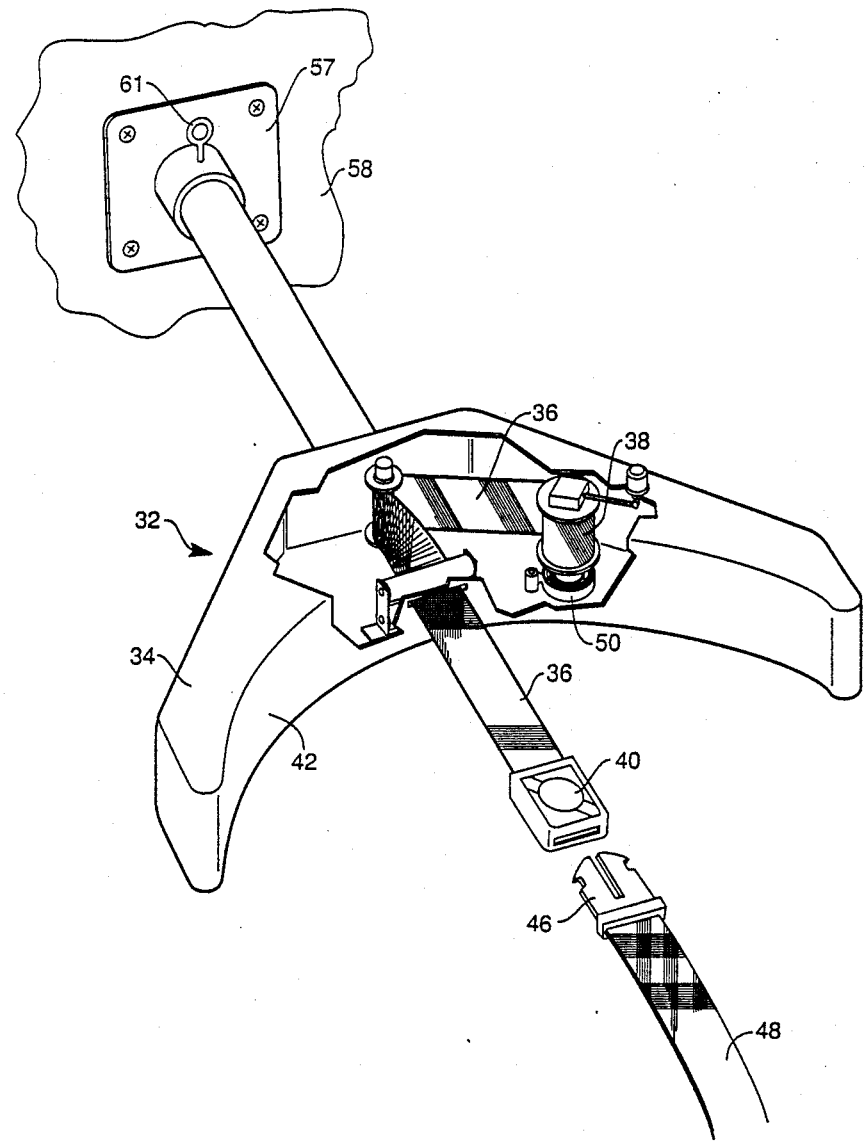
FIG. 3 is a perspective view of part of the body restraint system in FIG. 2.
Figure 6:
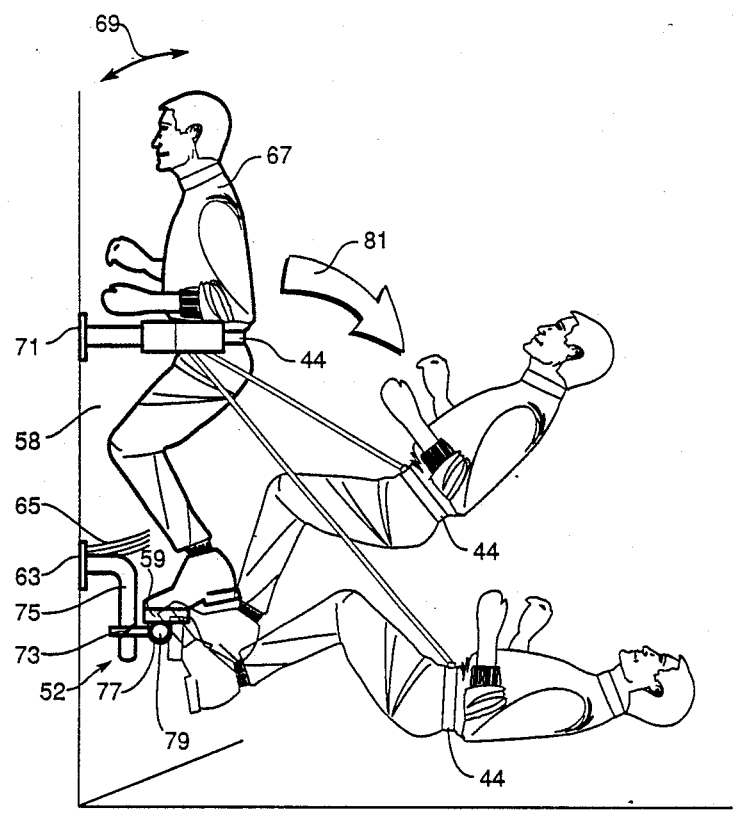
FIG. 6 is a side view of the body restraint system of FIGS. 1-5.

The capstan 38 is loaded by spring 50, so that the belt 36 acts similarly to an automobile seat restraint. The waist restraint 32 is positioned near foot restraints 52. In FIG. 2, the foot restraints 52 are connected to the waist restraint 32 by an angled member 54 in the proper position for the person 10 to rest feet 26 on the supports 52 with the body in the zero gravity neutral posture. Three sets of the foot restraints 52 are provided to accommodate people of different sizes. In FIG. 3, the waist restraint 32 is shown attached to a wall 58 by means of a bracket 57 and a releasable pin 61, so that the waist restraint 32 can be removed from the wall 58 for movement from place to place, for attachment to other brackets 57. In FIGS. 4 and 5, the foot restraints 52 and the waist restraint 32 are both attached to a console 56. In FIG. 6, the waist restraint 32 and the foot restraints 52 are attached to wall 58. Bracket 63 is attached to wall 58 for movement along curved track 65 so that person 67 can pivot in the direction indicated by arrow 69. Waist restraint 32 is pivotally attached to bracket 71 so that it will pivot with the person 67. A wing nut 73 attaches foot platforms 59 to support rod 75 for adjustment to accomodate different height persons 67. A friction strap 77 attaches the foot platforms 59 to tube 79 so that the foot platforms will pivot as indicated when the person 67 pivots backward, as indicated by arrow 81.

The foot restraints 52 have foot platforms 59 with pads 60 of a suitable two part attaching material, such as the fasteners available from Minnesota Mining and Manufacturing Company under the trademark Scotchmate Duallock. This product is also known as a "mushroom fastener," denoting the shape of interlocking units comprising the fastener. A mating pad 62 of the material is provided on soles 64 of cotton net shoes 66. The pads 60 and 62 are flexible, producing an ease of connection and release similar to Velcro pads. Velcro pads could also be used for the foot restraints 52, but Velcro tends to flake and produce dust, which would be a problem in space. The cotton net shoes 66 provide suitable comfort and ventilation and are easy to wear all of the time. Obviously, the shoes 66 need not be as sturdy as shoes intended for a gravity environment. Simple sandals with wide elastic straps would also be suitable.

In use of the body restraint system 30, when the person pushes off slowly, the belt 36 extends to allow the person to reach a wider area, as shown in FIGS. 5 and 6, such as to reach a control that cannot be reached in the position of FIG. 4. Note that the extended and pivoted positions shown and indicated in FIG. 6 might appear to be of little use in a terrestrial environment, but might be very useful positions in a zero or microgravity environment. The spring 50 tends to retract the belt 36, so that it will slowly reel the person 10 back to the waist restraint 32 in the absence of pushing off force.

Figure 7:
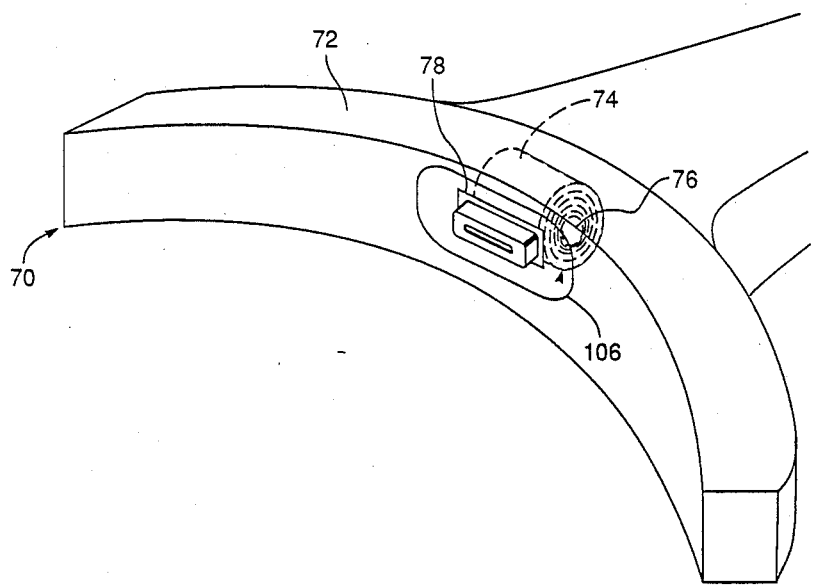
FIG. 7 is a perspective view of another embodiment of part of a body restraint system in accordance with the invention.
Figure 8:
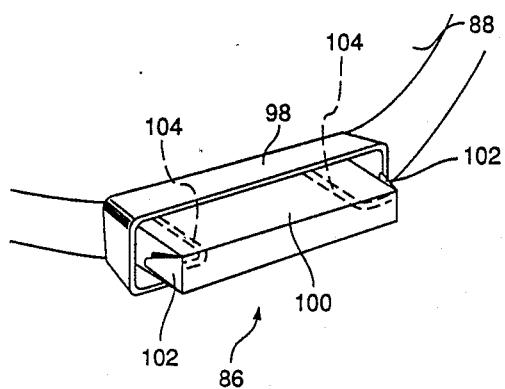
FIG. 8 is an enlarged perspective view of a portion of the body (restraint system part shown in FIG. 7.
Figure 9:
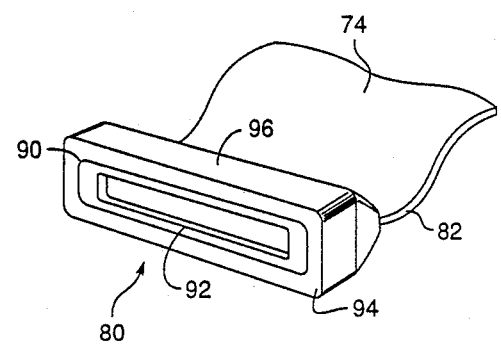
FIG. 9 is a perspective view of another portion of the body restraint system shown in part in FIGS. 7-8.

FIGS. 7, 8 and 9 show another form of a waist restraint 70 which can be substituted for the waist restraint 32 of FIGS. 2-6. The waist restraint 70 has a curved, padded unit 72 containing a belt 74 coiled on a capstan 76 behind opening 78. A buckle 80 on end 82 of the belt 74 extends from the opening 78 of the unit 72. A clasp 86 is attached to a crewmember's clothing 88 and is configured to engage the buckle 80. The buckle 80 has an opening 90 with a lip 92 around its periphery in front 94 of housing 96. The clasp 86 has an open fronted enclosure 98 which fits over the housing 96. Enclosure 98 is slideably mounted for movement backward and forward relative to centrally positioned plug 100. The plug 100 has pivotally movable tabs 102 at either side, connected to the enclosure 98 by linkages 104. When the plug 100 is inserted through the opening 90, the tabs 102 are flush against the plug 100. When the enclosure 98 is moved forward over the housing 96, linkages 104 move the tabs 102 to the position shown in FIG. 8, so that the tabs 102 catch on lip 92 to hold the clasp 86 and the buckle 80 together. When the user wants to disconnect the clasp 86 from the buckle 80, the user pulls back on the enclosure 98, causing the linkages 104 to move the tabs 102 flush against plug 100, allowing the plug 100 to be withdrawn from the opening 90. The unit 72 has a recess 106 around the opening 78, so that front 108 of the unit 72 is flush against the user's waist when the clasp 86 is attached to the buckle 80 and the belt 74 is fully retracted.

It should now be readily apparent to those skilled in the art that a novel body restraint system capable of achieving the stated objects of the invention has been provided. The body restraint system is especially suited for a zero or microgravity environment, because it provides a positive restraint for the user's whole body and requires no strain by the user in order to be restrained. The body restrain system is compatible with the neutral body position in a zero or microgravity environment.

The body restraint system will restrain the user's body in an appropriate work space envelope while allowing the user to perform various tasks without having to disconnect from the restraint system. The body restraint system incorporates three points of body contact, at least one of which can be displaced linearly. The body restraint system incorporates a simple positive locking mechanism and which does not require the user to be precise in foot placement. The body restraint system incorporates three points of body contact in which the user's hands remain free.

It should further be apparent to those skilled in the art that various changes in form and detail of the invention as shown and described may be made. It is intended that such changes be included within the spirit and scope of the claims appended hereto.

What is claimed is:

1. A body restraint system for a zero or microgravity environment, which comprises a waist restraint having a housing with a curved front, shaped to engage a user's waist, said housing containing a retractable belt having a buckle extendable from the front of said housing, a catch configured to engage said buckle, said catch being connected to a means for attaching said catch to the user's waist, and a pair of foot restraints with pads of a two part attaching material positioned to engage mating pads of the two part attaching material on the user's shoes.

2. The body restraint system for a zero or microgravity environment of claim 1 in which said pair of foot restraints are positioned with respect to said waist restraint so that the user's body assumes a zero gravity neutral posture when the user's waist engages said waist restraint and the user's feet engage said pair of foot restraints.

3. The body restraint system for a zero or microgravity environment of claim 2 in which a plurality of pairs of said foot restraints are positioned with respect to said waist restraint so that users of different sizes may have their bodies in the zero gravity neutral posture when their waists engage said waist restraint and their feet engage one of said plurality of pairs of foot restraints.

4. The body restraint system for a zero or microgravity environment of claim 1 in which said waist restraint has a recessed area around said buckle configured so that the user's waist is flush with the curved front of said housing when said catch and said buckle are engaged with said belt in its retracted position.

5. The body restraint system for a zero or microgravity environment of claim 1 in which the pads of said pair of foot restraints comprise generally mushroom shaped plastic units configured to interlock with corresponding mushroom shaped plastic units on the mating pads.

6. The body restraint system for a zero or microgravity environment of claim 1 in which said waist restraint and said pair of foot restraints are attached to a console.

7. The body restraint system for a zero or microgravity environment of claim 1 in which said waist restraint and said pair of foot restraints are attached to a wall.

8. The body restraint system for a zero or microgravity environment of claim 1 in which said waist restraint and said pair of foot restraints are attached to a supporting surface, and at least one of said waist restraint and said pair of foot restraints is movably positioned with respect to another of said waist restraint and said pair of foot restraints to accomodate users of different size.

9. The body restraint system for a zero or microgravity environment of claim 1 in which said waist restraint and said pair of foot restraints are attached to a supporting surface, and said pair of foot restraints is movable along said support surface and said waist restraint is pivotable to permit the user to pivot generally parallel to the supporting surface.

10. The body restraint system for a zero or microgravity environment of claim 9 in which said pair of foot restraints is movable along said support surface in a curved track.

11. A body restraint system for a zero or microgravity environment, which comprises a waist restraint including means to engage a user's waist, said means to engage the user's waist including a retractable tether, and a pair of foot restraints, said pair of foot restraints being positioned with respect to said waist restraint so that the user's body assumes a zero gravity neutral posture when the user's waist engages said waist restraint and the user's feet engage said pair of foot restraints.

12. The body restraint system for a zero or microgravity environment of claim 11 in which a plurality of pairs of said foot restraints are positioned with respect to said waist restraint so that users of different sizes may have their bodies in the zero gravity neutral posture when their waists engage said waist restraint and their feet engage one of said plurality of pairs of foot restraints.

13. The body restraint system for a zero or microgravity environment of claim 11 in which said pair of foot restraints comprise pads of generally mushroom shaped plastic units configured to interlock with corresponding mushroom shaped plastic units on mating pads attached to shoes of the user.

14. The body restraint system for a zero or microgravity environment of claim 11 in which said waist restraint and said pair of foot restraints are attached to a console.

15. The body restraint system for a zero or microgravity environment of claim 11 in which said waist restraint and said par of foot restraints are attached to a wall.

16. The body restraint system for a zero or microgravity environment of claim 11 in which said waist restraint and said pair of foot restraints are attached to a supporting surface, and at least one of said waist restraint and said pair of foot restraints is movably positioned with respect to another of said waist restraint and said pair of foot restraints to accomodate users of different size.

17. The body restraint system for a zero or microgravity environment of claim 11 in which said waist restraint and said pair of foot restraints are attached to a supporting surface, and said pair of foot restraints is movable along said support surface and said waist restraint is pivotable to permit the user to pivot generally parallel to the supporting surface.

18. The body restraint system for a zero or microgravity environment of claim 17 in which said pair of foot restraints is movable along said support surface in a curved track.

19. A waist restraint for a zero or microgravity environment, which comprises a housing with a curved front, shaped to engage a user's waist, said housing containing a retractable belt having a buckle extendable from the front of said housing, a catch configured to engage said buckle, said catch being connected to a means for attaching said catch to the user's waist.

20. The body restraint system for a zero or microgravity environment of claim 19 in which said waist restraint has a recessed area around said buckle configured so that the user's waist is flush with the curved front of said housing when said catch and said buckle are engaged with said belt in its retracted position.

21. The body restraint system for a zero or microgravity environment of claim 19 in which said buckle has a housing with an opening having a lip around its periphery in front of said housing, said catch has a centrally positioned plug and an open fronted enclosure, said enclosure fitting over said housing, said enclosure being slideably mounted for movement backward and forward relative to said plug, said plug having at least one movable projections connected to said enclosure by at least one linkage for moving said at least one projection into and out of position to engage said lip by moving said enclosure backward and forward to hold said catch and said buckle together.

* * * * *